US006937405B2

(12) United States Patent
Sugawara

(10) Patent No.: US 6,937,405 B2
(45) Date of Patent: Aug. 30, 2005

(54) OPTICAL PICKUP PROJECTING TWO LASER BEAMS FROM APPARENTLY APPROXIMATED LIGHT-EMITTING POINTS

(75) Inventor: Satoru Sugawara, Miyagi (JP)

(73) Assignee: Ricoh Company, Ltd. (JP)

( * ) Notice: Subject to any disclaimer, the term of this patent is extended or adjusted under 35 U.S.C. 154(b) by 985 days.

(21) Appl. No.: 09/795,451

(22) Filed: Mar. 1, 2001

(65) Prior Publication Data

US 2001/0019531 A1 Sep. 6, 2001

(30) Foreign Application Priority Data

Mar. 3, 2000 (JP) ....................................... 2000-058921
Sep. 11, 2000 (JP) ....................................... 2000-275557
Dec. 28, 2000 (JP) ....................................... 2000-401682

(51) Int. Cl.$^7$ ............................ G02B 7/02; G02B 3/02; G11B 7/00

(52) U.S. Cl. ....................... 359/819; 359/833; 359/719; 359/718; 369/44.22; 369/112.23

(58) Field of Search ................................ 359/819, 833, 359/719, 718; 369/44.22, 44.23, 112.23, 112.24, 112.25, 112.26

(56) References Cited

U.S. PATENT DOCUMENTS 4,835,380 A * 5/1989 Opheij et al. ............... 250/216
6,034,797 A * 3/2000 Ju et al. ....................... 359/15

FOREIGN PATENT DOCUMENTS

JP 11-039684 2/1999

* cited by examiner

*Primary Examiner*—Georgia Epps
*Assistant Examiner*—Tim Thompson
(74) *Attorney, Agent, or Firm*—Dickstein Shapiro Morin & Oshinsky LLP

(57) ABSTRACT

An integrated type optical pickup module apparently approximates a plurality of light-emitting points of semiconductor lasers. An optical element is interposed between first and second semiconductor lasers. The optical element has first and second reflecting surfaces perpendicular to each other. The first and second reflecting surfaces reflect laser beams projected from the first and second semiconductor lasers, respectively. The optical element further has a mounting surface perpendicular to both the first and second reflecting surfaces. The optical element is mounted, via the mounting surface of the optical element, to a submount having a top surface on which the first and second semiconductor lasers are mounted. Heterojunction surfaces of the first and second semiconductor lasers may be substantially perpendicular to the first and second reflecting surfaces, respectively.

26 Claims, 11 Drawing Sheets

OPTICAL PICKUP PROJECTING TWO LASER BEAMS FROM APPARENTLY APPROXIMATED LIGHT-EMITTING POINTS

BACKGROUND OF THE INVENTION

1. Field of the Invention

The present invention generally relates to an integrated type optical pickup and, more particularly, to an integrated type optical pickup having semiconductor lasers that projects laser beams having different wavelength.

2. Description of the Related Art

In Recent years, various kinds of optical discs have become popular as optical recording media. A compact disc (CD), a recordable compact disc (CD-R) and a rewritable compact disc (CD-RW) are classified into a CD group optical disc. A digital versatile disc (DVD), a recordable digital versatile disc (DVD-R), a rewritable digital versatile disc (DVD-RW) and S-DVD are classified into a DVD group high-density optical disc. Accordingly, it is preferable that a single recording and reproducing apparatus can record or reproduce a plurality of types of optical discs.

However, a laser beam having a wavelength of 780 nm is used for the CD group optical disc while a laser beam having a wavelength of 650 nm is used for the DVD group high-density optical disc. A beam spot of a laser beam having the wavelength of 780 nm cannot be reduced into a size equal to the size of each pit formed on the DVD group high-density optical disc. Accordingly, information recorded on the DVD group high-density optical disc cannot be read by the laser beam having the wavelength of 780 nm. On the other hand, a colorant used for the CD-R does not reflect a laser beam having the wavelength of 650 nm but let the laser beam passing therethrough. Accordingly, information recorded on the CD-R cannot be read by the laser beam having the wavelength of 650 nm.

Accordingly, in order to record or reproduce both the CD-R and the DVD group high-density optical discs, two semiconductor lasers that can generate laser beams having wavelengths of 780 nm and 650 nm must be used. When a single optical system is shared by two semiconductor lasers generating laser beams having the wavelength of 780 nm and 650 nm, the two light-emitting points of the laser beams must be as close as possible. Preferably, the distance between the two light-emitting points is less than 100 $\mu$m.

Accordingly, a semiconductor laser device has been suggested which has two horizontally arranged semiconductor lasers, one of which generates a laser beam having the wavelength of 650 nm and the other generates a laser beam having the wavelength of 780 nm. However, a characteristic of such an arrangement of the semiconductor laser chips is influenced by a width of each laser chip and a width of a mounting portion. Since a distance between the semiconductor laser chips must be as large as 300 $\mu$m to 400 $\mu$m, it is difficult to design an optical system of an optical pickup that requires the laser beams to be projected from a single light-emitting point or two approximated light-emitting points.

On the other hand, a semiconductor laser device having a single semiconductor laser chip has been suggested, which semiconductor laser chip can generate two laser beams having different wavelengths. Additionally, a method has been suggested in which two semiconductor laser chips are arranged side by side, each of which has a light-emitting point on an edge thereof. However, such a semiconductor laser device is not available since it is not placed on the general market.

Accordingly, a method has been suggested in which two semiconductor laser chips having a regular structure are used by approximating two light-emitting points in a pseudo manner by using reflection surfaces. That is, the two light-emitting points are arranged so as to be apparently very close to each other due to the laser beams being reflected by the reflecting surfaces.

Japanese Laid-Open Patent Application 11-39684 discloses a method in which light-emitting points are approximated with each other in a pseudo manner by using a mounting member having a triangular cross section.

FIG. 1 shows a laser chip mounting structure disclosed in Japanese Laid-Open Patent Application 11-39684. In FIG. 1, laser beams B1 and B2 are emitted from semiconductor lasers 2-1 and 2-1 mounted on a submount 4. The laser beams B1 and B2 are deflected by oblique reflection surfaces 6-1 and 6-2 of a triangular portion 6 formed on the submount 4, respectively, so that the light-emitting points from which the laser beams B1 and B2 are projected are apparently approximated with each other.

In order to achieve the a mounting structure shown in FIG. 1, the triangular portion 6 having a triangular cross section must be formed on the submount 4. There have been suggested some methods of forming the oblique reflection surfaces 6-1 and 6-2. However, it is difficult to make the oblique reflection surfaces 6-1 and 6-2 each of which forms an angle of 45 degrees with respect to the surface of the submount 4. Thus, those methods cannot be applied to a mass production process.

The mounting member having such a structure can be made by anisotropic etching of a silicon (Si) substrate. However, the silicon substrate cannot provide a large electric resistance, which is sufficient for electrically isolating two semiconductor laser chips from each other. Thus, the silicon substrate has not been used in actual products.

There is a method of forming a microprism on an insulating substrate, which can achieve the mounting structure shown in FIG. 1. That is, the triangular portion 6 is made by the microprism, which is mounted on the mounting member made of an insulating material. However, it is very difficult to form such a microprism having a triangular cross section, thereby increasing a manufacturing cost. A microprism having a triangular cross section can be formed separately from the mounting member so as to be placed on the mounting member made of an insulating material. However, in such a structure, there is a problem in that a distance between apparent light-emitting points is changed due to a change in a mounting height of the microprism.

FIGS. 2A and 2B are illustrations for explaining the change in the distance between apparent light-emitting points due to a change in the mounting height of the microprism. In FIGS. 2A and 2B, laser beams are projected from semiconductor lasers 10-1 and 10-2 along an optical axis 12 toward the microprism 14 while spreading in directions perpendicular to the optical axis 12. In order to prevent the laser beams from interfering with the surface of the mounting member 16, the microprism 14 is placed in a recess **16*a* formed in the mounting member 16**.

In the structure shown in FIGS. 2A and 2B, if a depth of the recess **16*a* fluctuates, the position of the microprism 14 relative to the semiconductor laser chips 10-1 and 10-2 changes, as interpreted from comparison of FIG. 2A and FIG. 2B. Accordingly, the distance between the apparent light-emitting points of the semiconductor laser chip 10-1** and 10-2 is changed. Thus, the mounting member 16 including the recess 16*a* must be formed with a very high accuracy, thereby increasing a manufacturing cost of the mounting member 16. Thus, the mounting member 16 is not suitable for practical use.

SUMMARY OF THE INVENTION

It is a general object of the present invention to provide an improved and useful optical pickup in which the above-mentioned problems are eliminated.

A more specific object of the present invention is to provide an integrated type optical pickup module which can apparently approximate a plurality of light-emitting points of semiconductor lasers by using reflecting surfaces in a simple structure so that the optical pickup module and an optical pickup using such an optical pickup module are suitable for a mass production with a reduced manufacturing cost.

In order to achieve the above-mentioned objects, there is provided according to one aspect of the present invention an integrated type optical pickup module comprising: a first semiconductor laser and a second semiconductor laser; an optical element interposed between the first and second semiconductor lasers, the optical element having a first reflecting surface and a second reflecting surface perpendicular to the first reflecting surface, the first reflecting surface reflecting a laser beam projected from the first semiconductor laser, the second reflecting surface reflecting a laser beam projected from the second semiconductor laser, the optical element further having a mounting surface perpendicular to both the first and second reflecting surfaces; and a submount having a top surface on which the first and second semiconductor lasers are mounted, wherein the optical element is mounted to the submount via the mounting surface of the optical element.

According to the present invention, the optical element has the first and second reflecting surfaces perpendicular to each other so as to approximate the apparent light-emitting points of the laser beams projected from the first and second semiconductor lasers. Additionally, the optical element has the mounting surface perpendicular to both the first and second reflecting surfaces. Further, the optical element is mounted to the mounting surface of the submount which mounting surface is perpendicular to the top surface on which the first and second semiconductor lasers are mounted. Accordingly, both the optical element and the submount can be formed by surfaces perpendicular to each other, and does not require formation of a surface that forms an angle of 45 degrees with respect to other surfaces. Thus, the integrated type optical pickup module according to the present invention can be easily manufactured at a low cost.

In the integrated type optical pickup module according to the present invention, the submount may have a recessed portion in which the optical element is positioned. Accordingly, the laser beams projected from the first and second semiconductor lasers do not interfere with the top surface on which the first and second semiconductor lasers are mounted even if the laser beams have a relatively large projecting angle.

In one embodiment of the present invention, the recessed portion may have a side surface perpendicular to the top surface of the submount, and the mounting surface of the optical element may be connected to the side surface of the recessed portion.

In another embodiment of the present invention, the recessed portion may have a bottom surface parallel to the top surface of the submount, and the mounting surface of the optical element may be connected to the bottom surface of the recessed portion.

In the integrated type optical pickup module according to the present invention, the submount may be made of an insulating material so as to electrically isolate the first and second semiconductor lasers mounted on the top surface of the submount. Additionally, the submount is preferably formed of a multi-layered substrate made of ceramics.

In the integrated type optical pickup module according to the present invention, the optical element may have a rectangular parallelepiped shape. The optical element may be formed of single crystal silicon, and the first and second reflecting surfaces of the optical element correspond to the (110) plane and the (111) plane of the single crystal silicon. Additionally, the second reflecting surface may correspond to the (111) plane, and the second semiconductor laser may project a laser beam having a wavelength smaller than a wavelength of a laser beam projected from the first semiconductor laser. Further, the first reflecting surface may have a size different from a size of the second reflecting surface.

Additionally, there is provided according to another aspect of the present invention an integrated type optical pickup module comprising: a first semiconductor laser and a second semiconductor laser; and an optical element interposed between the first and second semiconductor lasers, the optical element having a first reflecting surface and a second reflecting surface perpendicular to the first reflecting surface, the first reflecting surface reflecting a laser beam projected from the first semiconductor laser, the second reflecting surface reflecting a laser beam projected from the second semiconductor laser, wherein a heterojunction surface of the first semiconductor laser is substantially perpendicular to the first reflecting surface, and a heterojunction surface of the second semiconductor laser is substantially perpendicular to the second reflecting surface.

The laser beam projected from each of the first and second semiconductor lasers has a projecting angle relating to an optical structure of the light-emitting surface. That is, in a laser beam projected from a semiconductor laser having a general refractive index waveguide structure, the projection angle in the direction perpendicular to the heterojunction surface of the semiconductor laser is much larger than the projecting angle in the direction parallel to the heterojunction surface. Accordingly, the laser beam projected from each of the first and second semiconductor lasers forms a beam spot having an extremely flat shape elongated in the direction perpendicular to the heterojunction surface. In order to effectively use the laser beams projected from the first and second semiconductor lasers, the entire laser spot of the laser beam projected from each of the first and second semiconductor lasers must be formed on the respective reflecting surfaces. Accordingly, it is preferable that each of the laser beams projected onto the reflecting surfaces forms a beam spot elongated in the direction parallel to a cross line along which the first and second reflecting surfaces intersect with each other rather than forming a beam spot elongated in the direction perpendicular to the cross line so that a distance between the beam spots on the first and second reflecting surfaces is reduced. This distance is considered to be a distance between the apparent light-emitting points. Accordingly, in order to reduce the distance between the apparent light-emitting points of the laser beams projected from the first and second semiconductor lasers, the longitudinal direction of the laser beam spot on the first and second reflecting surfaces preferably be parallel to the cross line between the first and second reflecting surfaces of the optical element. Considering the above-mentioned beam spot formed by the laser beams, the first and second reflecting surfaces are preferably positioned perpendicular to the respective one of the first and second reflecting surfaces so as to reduce the distance between the apparent light-emitting points of the laser beams projected from the first and second semiconductor lasers.

In order to achieve the above-mentioned invention, it is preferable that an optical axis of the first semiconductor laser forms an angle of 45 degrees with respect to the first reflecting surface, and an optical axis of the second semiconductor laser forms an angle of 45 degrees with respect to the second reflecting surface.

Additionally, the integrated type optical pickup module according to the present invention may further comprise a submount having a top surface on which the first and second semiconductor lasers are mounted. Alternatively, the integrated type optical pickup module may further comprise a submount on which the first and second semiconductor lasers and the optical element are mounted.

The submount may have a top surface on which the first and second semiconductor lasers are mounted, and the submount may further have a recessed portion between the first and second semiconductor lasers so that the optical element is situated in the recessed portion. The optical element preferable has a rectangular parallelepiped shape.

Additionally, the optical element may be made of a semiconductor material. Preferably, the optical element is formed of single crystal silicon, and the first and second reflecting surfaces of the optical element correspond to the (110) plane and the (111) plane of the single crystal silicon. More preferably, the second reflecting surface corresponds to the (111) plane, and the second semiconductor laser projects a laser beam having a wavelength smaller than a wavelength of a laser beam projected from the first semiconductor laser. Additionally, the first reflecting surface has a size different from a size of the second reflecting surface.

Additionally, there is provided according another aspect of the present invention an optical pickup comprising: a laser beam source; and an optical system which guides a laser beam projected from said laser beam source toward an optical recording medium and receives the laser beam reflected by the optical recording medium so as to guides the reflected laser beam to light-receiving elements, wherein the laser beam source includes one of the integrated type optical pickup modules having the above-mentioned structure.

In the optical pickup according to the present invention, the submount of the integrated type optical pickup module may have a mounting surface perpendicular to the top surface thereof so that the integrated type optical pickup module is mounted to a flat surface of a base substrate via the mounting surface, and a semiconductor substrate having the light-receiving elements may also be mounted on the flat surface of the base substrate.

Alternatively, in the optical pickup according to the present invention, the submount of the integrated type optical pickup module may have a mounting surface perpendicular to the top surface so that the integrated type optical pickup module is mounted to a flat surface of a base substrate via the mounting surface, and the light-receiving elements may be formed on the flat surface of the base substrate.

Other objects, features and advantages of the present invention will become more apparent from the following detailed description when read in conjunction with the accompanying drawings.

DETAILED DESCRIPTION OF THE PREFERRED EMBODIMENTS

Figure 1:
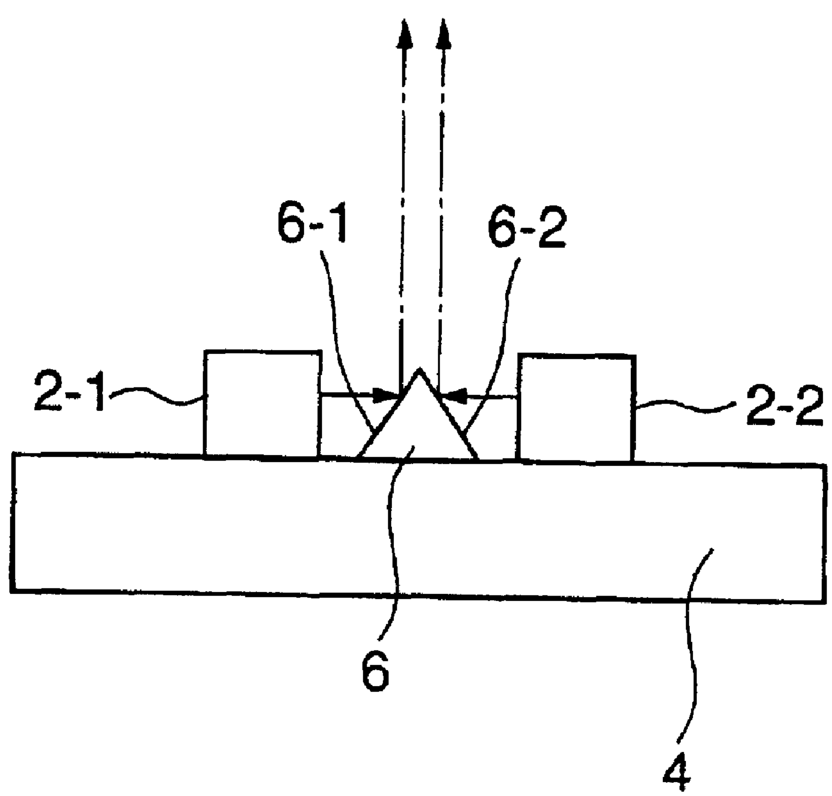
FIG. 1 is an illustration of a conventional laser chip mounting structure.
Figure 2A:
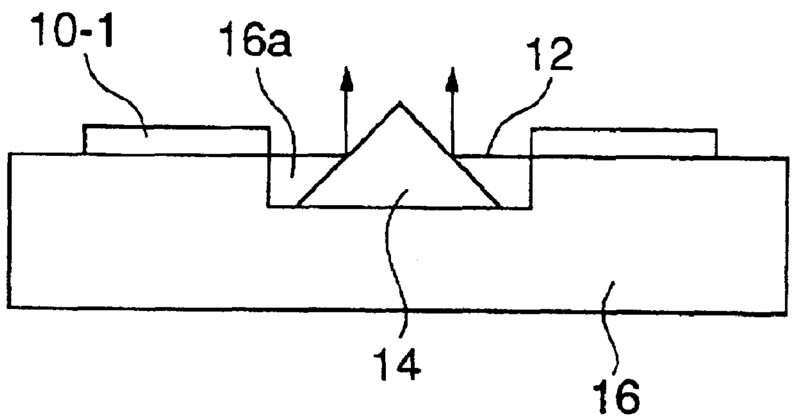
FIGS. 2A and 2B are illustrations for explaining a change in a distance between apparent light-emitting points due to a change in a mounting height of a microprism.
Figure 2B:
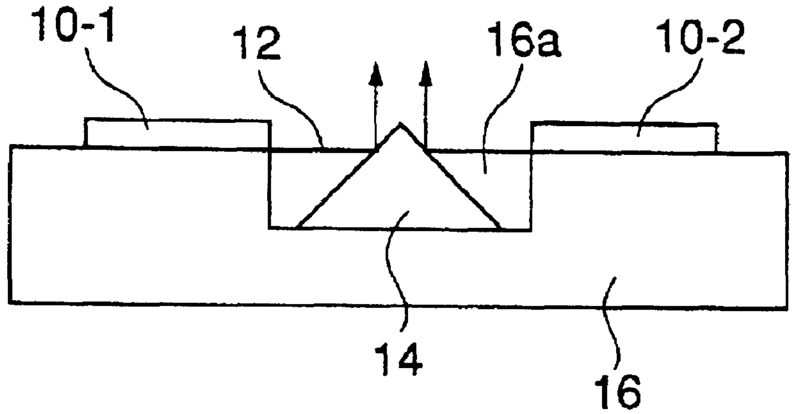
Figure 3A:
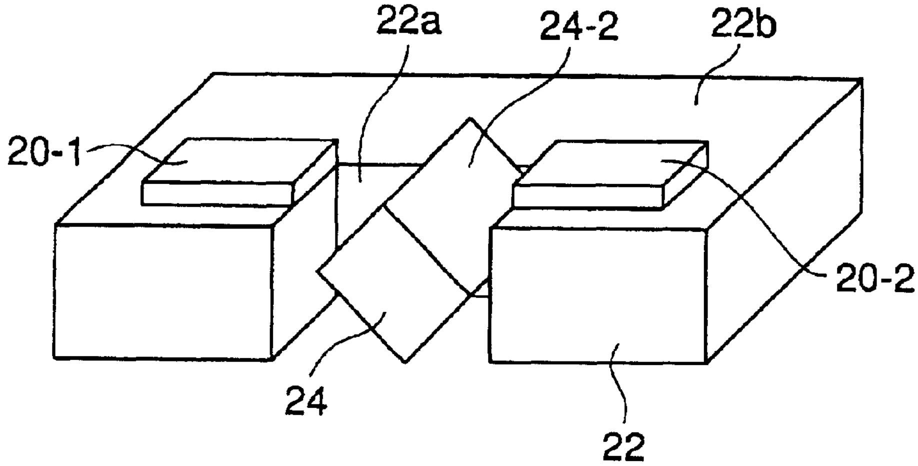
FIG. 3A is a perspective view of an integrated type optical pickup module according to a first embodiment of the present invention.
Figure 3B:
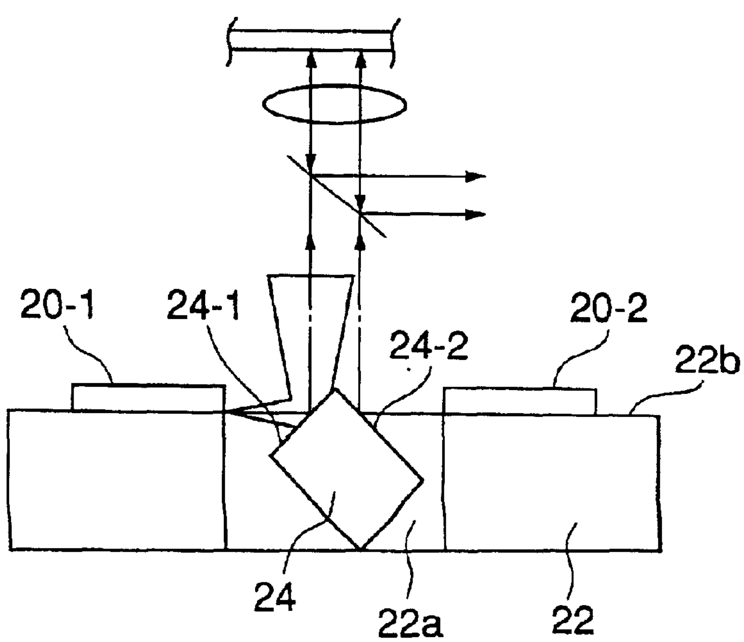
FIG. 3B is a side view of the integrated type optical pickup module shown in FIG. 3A.

A description will now be given, with reference to FIGS. 3A and 3B, of a first embodiment of the present invention. FIG. 3A is a perspective view of an integrated type optical pickup module according to the first embodiment of the present invention. FIG. 3B is a front view of the integrated type optical pickup module shown in FIG. 3A.

In FIGS. 3A and 3B, two semiconductor lasers 20-1 and 20-2 are mounted on a submount 22 having a substantially channel shape. The submount 22 is formed of an insulating material such as aluminum nitride (AlN). Preferably, the submount 22 is formed of a multi-layered substrate made of ceramics.

The semiconductor lasers 20-1 and 20-2 are positioned on opposite sides of an optical element 24 so that light-emitting surfaces of the semiconductor lasers 2-1 and 2-2 are opposite to each other with the optical element 24 interposed therebetween.

The optical element 24 has a substantially rectangular parallelepiped shape having reflecting surfaces 24-1 and 24-2. The optical element 24 is formed by anisotropic etching of a single crystal silicon substrate. The reflecting surface 24-1 is formed along the (110) plane of the single crystal silicon substrate, and the reflecting surface 24-2 is formed along the (111) plane of the single crystal silicon substrate.

A Ti/Au thin film is deposited on the reflecting surfaces 24-1 and 24-2 so that the laser beams projected from the semiconductor lasers 20-1 and 20-2 are reflected or deflected by the respective reflecting surfaces 24-1 and 24-2.

Since the optical element 24 is formed in the rectangular parallelepiped shape, the optical element 24 has a mounting surface perpendicular to both the reflecting surfaces 24-1 and 24-2. The optical element 24 is mounted to the submount 22 by connecting the mounting surface of the optical element 24 to a surface 22*a* of the submount 22. The surface 22*a* is perpendicular to a top surface 22*b* of the submount 22 on which the semiconductor lasers 20-1 and 20-2 are mounted.

In the above-mentioned structure, the laser beams projected from the semiconductor lasers 20-1 and 20-2 are reflected or deflected by the optical element 24 as if the laser beams are projected from an apparent single light-emitting point or apparent light-emitting points very close to each other. In the present embodiment, the distance between the apparent light-emitting points is defined by a distance between a point at which the laser beam projected from the semiconductor laser 20-1 intersects the reflecting surface 24-1 and a point at which the laser beam projected from the semiconductor laser 20-2 intersects the reflecting surface 24-2. Thus, the distance between the apparent light-emitting points can be easily recognized by observing from above the surface 22*a* of the submount 22 and the optical element 24.

In the present embodiment, the reflecting surface 24-1 has a shorter side and the reflecting surface 24-2 has a longer side of the rectangular shape. Accordingly, the reflecting surface 24-1 corresponding to the (110) plane can be easily distinguishable from the reflecting surface 24-2 corresponding to the plane (111) by visual comparison.

It should be noted that a surface roughness of the reflecting surface 24-1 corresponding to the (110) plane is determined by a grinding process of a wafer from which the optical element is formed. On the other hand, a surface roughness of the reflecting surface 24-2 corresponding to the (111) plane has a magnitude of an atomic layer since the reflecting surface 24-2 is formed by anisotropic etching. Accordingly, the surface roughness of the reflecting surface 24-2 is lower than that of the reflecting surface 24-1.

It is preferred that a laser beam having a shorter wavelength is reflected by a surface having a lower surface roughness. Accordingly, in the present embodiment, the semiconductor laser 20-1 generates a laser beam having a wavelength of 780 nm and the semiconductor laser 20-2 generates a laser beam having a wavelength of 650 nm. Thus, the integrated type optical pickup module according to the present embodiment can be provided to an optical pickup that is used for reading or recording information on both a CD group optical disc and a DVD group optical disc.

The optical element 24 is preferably manufactured by using a semiconductor manufacturing process. Especially, as mentioned above, anisotropic etching of single crystal silicon is applicable to a manufacturing process of the optical element 24. That is, anisotropic etching of the single crystal silicon having the (111) plane facilitates the production of the optical element 24 having reflecting surfaces 24-1 and 24-2 perpendicular to each other.

The (111) plane of the single crystal silicon has an etching rate extremely lower than that of other planes when a particular etchant is used. For example, if a single crystal silicon substrate having a (110) plane on the surface thereof is etched by the particular etchant, a groove having a side surface corresponding to the (111) plane can be formed on the (110) plane surface. The (111) plane surface of the groove is perpendicular to the (110) plane surface. Since the (111) plane surface has a flatness of an atomic order, the (111) plane surface is suitable for the reflecting surface. Accordingly, the optical element 24 can be easily manufactured by using the above-mentioned anisotropic etching of the single crystal silicon substrate. Thus, the optical pickup module according to the present embodiment can be manufactured at a low cost.

In the present embodiment, the semiconductor element 24 is mounted on the submount 22, which is formed of an insulating material such as aluminum nitride (AlN). Normally, a semiconductor laser has a crystal growth layer on the anode side. Thus, the semiconductor laser is preferably mounted on the submount 22 with the anode side made in touch with the submount 22. Such a mounting structure is referred to as junction down. Additionally, considering a drive circuit for driving the semiconductor lasers, it is preferable that the cathode side of the semiconductor lasers is a common electrode. Accordingly, separate anode electrodes are formed on the surface 22*a* of the submount 22. Thus, it is preferable that the submount 22 is formed of an insulating material having a good electrical insulating characteristic. Accordingly, in the present embodiment as mentioned above, the submount 22 is formed of aluminum nitride (AlN), which ceramics having a good electrical insulating characteristic. The submount 22 having the channel shape member 22 can be formed with good accuracy by using a multi-layered structure and forming the channel shape prior to a sintering process.

The above-mentioned integrated type optical pickup module according to the present embodiment is provided to an optical pickup. The optical pickup comprises: a laser beam source including the optical pickup module; an optical system which collimates the laser beam projected from the laser beam source; an objective lens which focuses the laser beam onto a recording medium such as an optical disc; an optical system which leads the laser beam reflected by the optical disc to an optical detecting unit; and a light-receiving element provided in the optical detecting unit so as to detect various signals such as a recording signal, a focus error signal or a tracking error signal. The above-mentioned objective lens and optical systems may be provided in the projecting direction of the laser beam. Additionally, the light-receiving element of the optical detecting unit may be mounted on the submount 22 or a substrate on which the optical pickup module according to the present embodiment is mounted.

According to the present embodiment, the optical element 24 has two reflecting surfaces 24-1 and 24-2 forming an angle of 90 degrees so as to approximate the apparent light-emitting points. Additionally, the optical element 24 has a mounting surface perpendicular to both the reflecting surfaces 24-1 and 24-2. Further, the optical element 24 is mounted to the surface 22*a* of the submount 22 which surface is perpendicular to the top surface 22*b* on which the semiconductor lasers 20-1 and 20-2 are mounted. Accordingly, both the optical element 24 and the submount 22 of the optical pickup module according to the present embodiment can be formed by only surfaces perpendicular to each other, and does not require formation of a surface that forms an angle of 45 degrees with respect to other surfaces. Thus, the optical pickup module according to the present embodiment can be easily manufactured at a low cost.

Figure 4:
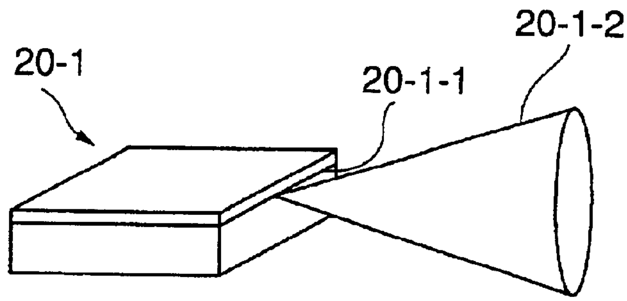
FIG. 4 is an illustration for explaining a shape of a laser beam projected from a semiconductor laser.
Figure 5A:
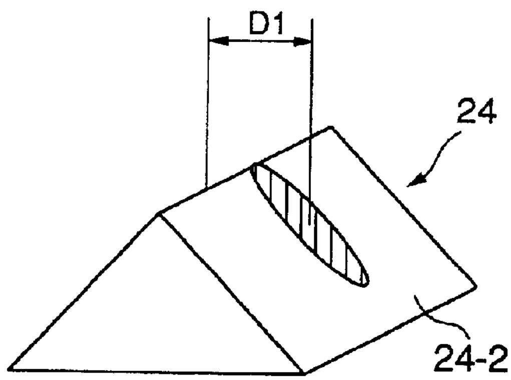
FIGS. 5A and 5B are illustrations for explaining a shape of a laser beam spot projected on a reflecting surface.
Figure 5B:
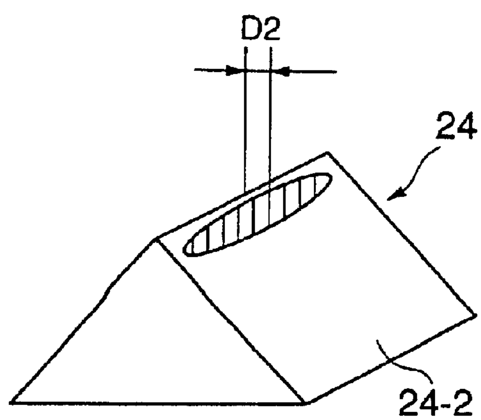

A description will now be given, with reference to FIGS. 4, 5A and 5B, of a beam spot formed by a laser beam on the reflecting surface of the optical element. FIG. 4 is an illustration for explaining a shape of a laser beam projected from the semiconductor lasers 20-1. FIGS. 5A and 5B are illustrations for explaining a shape of a laser beam spot projected on the reflecting surfaces 24-1 and 24-2. It should be noted that, in FIGS. 5A and 5B, only a part of the optical element 24 is shown, which part reflects the laser beams.

As shown in FIG. 4, the semiconductor laser 20-1 projects a laser beam 20-1-2 from an edge of a heterojunction surface 20-1-1. It should be noted the semiconductor laser 20-2 has the same structure as the semiconductor laser 20-1, and, therefore, the semiconductor laser 20-2 also project a laser beam from an edge of a heterojuction surface.

The laser beam projected from the semiconductor laser 20-1 (20-2) has a projecting angle relating to an optical structure of the light-emitting surface. That is, the projection angle of the laser beam 20-1-2 in a direction parallel to the heterojunction surface 20-1-1 of the semiconductor laser 20-1 is different from the projection angle of the laser beam 20-1-2 in a direction perpendicular to the heterojunction surface 20-1-1. That is, in a laser beam projected from a semiconductor laser having a general refractive index waveguide structure, the projection angle is about 10 degrees in the direction parallel to the heterojunction surface, and is about 25 degrees in the direction perpendicular to the heterojunction surface. Particularly, a blue semiconductor laser, which has been developed recently, has a projection angle of 5 degrees in the direction parallel to the heterojunction surface and 30 degrees in the direction perpendicular to the heterojunction surface.

Accordingly, the laser beam projected from each of the semiconductor lasers 20-1 and 20-2 forms a beam spot having an extremely elongated flat shape as shown in FIGS. 5A and 5B. In order to effectively use the laser beams projected from the semiconductor lasers 20-1 and 20-2, the entire laser spot of each of the laser beams must be formed on the respective reflecting surfaces 24-1 and 24-2.

In FIG. 5A, the laser beam projected on the reflecting surface 24-2 (24-1) has a beam spot elongated in a direction perpendicular to a cross line along which the reflecting surfaces 24-1 and 24-2 intersect with each other. On the other hand, in FIG. 5B, the laser beam projected on the reflecting surface 24-2 (4-1) has a beam spot elongated in a direction parallel to the cross line.

Comparing FIGS. 5A and 5B, it can be appreciated that a distance D2 between the beam spots on the reflecting surfaces 24-1 and 24-2 shown in FIG. 5B is much smaller than a distance D1 between the beam spots on the reflecting surfaces 24-1 and 24-2 shown in FIG. 5A. The distances D1 and D2 are considered to be the distance between the apparent light-emitting points. Accordingly, in order to reduce the distance between the apparent light-emitting points of the laser beams projected from the semiconductor lasers 20-1 and 20-2, the longitudinal direction of the laser beam spot on the reflecting surfaces 24-1 and 24-2 preferably be parallel to the cross line between the reflecting surfaces 24-1 and 24-2.

Considering the above-mentioned beam spot formed by the laser beams, the reflecting surfaces 20-1 and 20-2 are preferably positioned perpendicular to the semiconductor lasers 20-1 and 20-2 mounted on the surface 22*a* of the submount 22 so that the heterojunction surface of each of the semiconductor lasers 20-1 and 20-2 is perpendicular to the respective one of the reflecting surfaces 24-1 and 24-2 of the optical elements 24. This structure reduces the distance between the apparent light-emitting points of the laser beams projected from the semiconductor lasers 20-1 and 20-2.

Figure 6A:
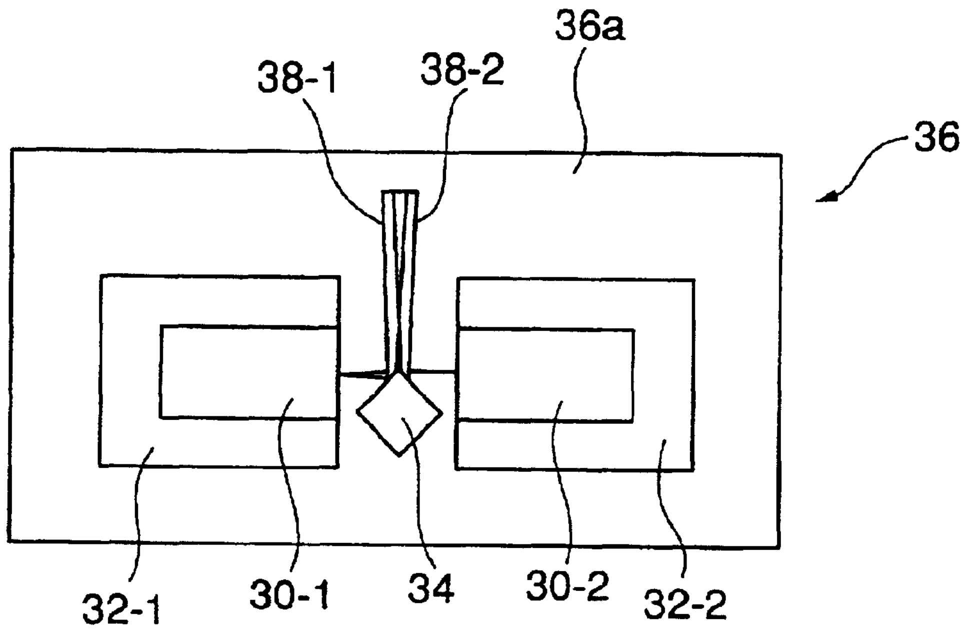
FIG. 6A is a perspective view of an integrated type optical pickup module according to a second embodiment of the present invention.
Figure 6B:
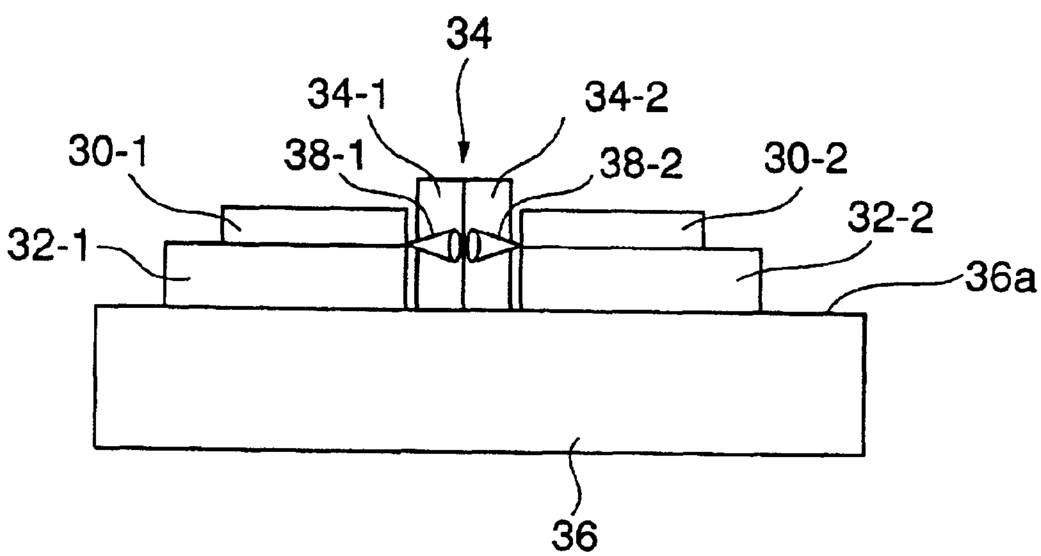
FIG. 6B is a plan view of the integrated type optical pickup module shown in FIG. 6A.

A description will now be give, with reference to FIGS. 6A and 6B, of a second embodiment according to the present invention. FIG. 6A is a perspective view of an integrated type optical pickup module according to the second embodiment of the present invention. FIG. 6B is a plan view of the integrated type optical pickup module shown in FIG. 6A.

The optical pickup module according to the second embodiment has two semiconductor lasers 30-1 and 30-2 mounted on submounts 32-1 and 32-2, respectively. The semiconductor lasers 30-1 and 30-2 are the same as the semiconductor lasers 20-1 and 20-2 provided in the first embodiment. The submounts 32-1 and 32-2 are formed of an insulating material such as aluminum nitride (AlN). The submounts 32-1 and 32-2 are mounted on a top surface 36*a* of a module base 36.

An optical element 34 having a square column shape is positioned between the semiconductor lasers 301 and 30-2. The optical element 34 is mounted on the top surface 36*a* of the submount 36 so that the laser beam projected from the semiconductor laser 30-1 is reflected or deflected by a surface 34-1 and the laser beam projected from the semiconductor laser 30-2 is reflected or deflected by a surface 34-2.

The reflecting surface 34-1 and the reflecting surface 34-2 correspond to side surfaces of the square column, and are perpendicular to each other. The optical element 34 is mounted to the top surface 36*a* of the submount 36 via a bottom surface of the optical element 34 having a square shape. Accordingly, each of the reflecting surfaces 34-1 and 34-2 is perpendicular to the bottom surface (mounting surface) of the optical element 34.

In the present embodiment, the optical element 34 is formed in the square column shape by cleaving a single crystal GaAs substrate. An aluminum thin film is deposited on each of the reflecting surfaces 34-1 and 34-2 so as to reflect a laser beam.

According to the above-mentioned arrangement of the semiconductor lasers 30-1 and 30-2 and the optical element 34, the laser beam 38-1 projected from the semiconductor laser 30-1 is reflected by the reflecting surface 34-1, and the laser beam 38-1 projected from the semiconductor laser 30-1 is reflected by the reflecting surface 34-1. The laser beams 38-1 and 38-2 reflected by the reflecting surfaces 34-1 and 34-2 travel substantially in the same direction, which is parallel to the top surface 36*a* of the submount 36.

In the present embodiment, the heterojunction surface of each of the semiconductor lasers 30-1 and 302 is perpendicular to the respective reflecting surfaces 34-1 and 34-2, and, thereby, the laser beam spot formed on each of the reflecting surfaces 34-1 and 34-2 becomes that shown in FIG. 5B. Accordingly, apparent light-emitting points of the laser beams 38-1 and 38-2 can be approximated as close as possible.

In the preset embodiment, the semiconductor lasers 30-1 and 30-2 are mounted to the module base 36 via the respective submounts 32-1 and 32-2 so that each the laser beams 38-1 and 38-2 do not interfere with the top surface 36*a* of module base 36. Accordingly, the height of the semiconductor lasers 30-1 and 30-2 from the top surface of the module base 36 can be adjusted by changing the thickness of the submounts 32-1 and 32-2.

In the present embodiment, the semiconductor lasers 30-1 and 30-2 are mounted on the respective submounts 32-1 and 32-2 in a junction down state. Thereby, the laser beams 38-1 and 38-2 are projected from a position corresponding to a top surface of the submounts 32-1 and 32-2. Accordingly, in order to effectively use the reflecting surfaces 34-1 and 32-2, the thickness of the submounts 32-1 and 32-2 are preferably one half (½) of the height of the optical element measured from the top surface 36*a* of the module base 36.

Additionally, similar to the first embodiment, a distance between the apparent light-emitting points can be easily recognized by observing from the front side of the optical pickup module. Thus, the distance between the apparent light-emitting points can be visually inspected.

Figure 7A:
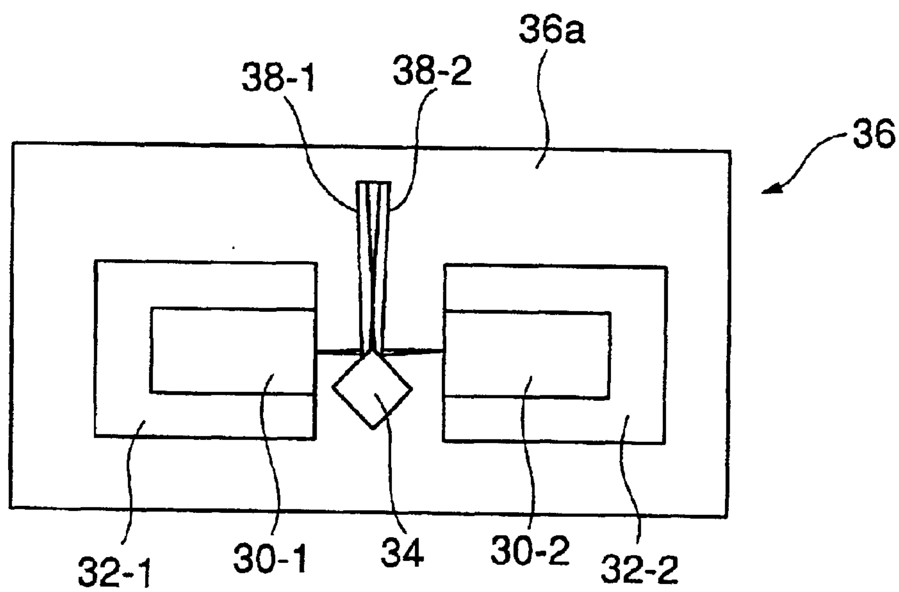
FIG. 7A is a plan view of an optical pickup module according to a variation of the second embodiment of the present invention.
Figure 7B:
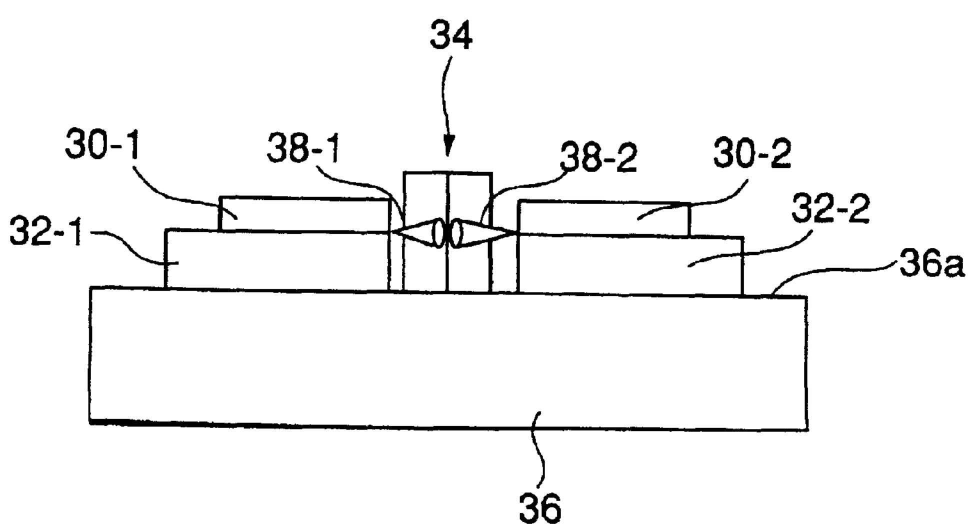
FIG. 7B is a front view of the optical pickup module shown in FIG. 7A.

FIGS. 7A and 7B shows a variation of the second embodiment of the present invention. FIG. 7A is a plan view of an optical pickup module according to the variation of the second embodiment of the present invention. FIG. 7B is a front view of the optical pickup module shown in FIG. 7A.

In the variation shown in FIGS. 7A and 7B, the optical element 34 is located in a different position from the second embodiment shown in FIGS. 6A and 6B. That is, the optical element 34 in this variation is moved by a predetermined distance toward the semiconductor laser 30-1. Accordingly, the optical element is moved away from the semiconductor laser 30-2. That is, the distance between the semiconductor laser 30-1 and the optical element 34 is smaller than the distance between the semiconductor laser 30-2 and the optical element 34.

In this variation, the laser beam 38-1 projected from the semiconductor laser 30-1 has a wavelength smaller than that of the laser beam 38-2 projected from the semiconductor laser 30-2. If the laser beams 38-1 and 38-2 shares the same optical system, the distances from an objective lens to each of the semiconductor devices must be varied due to the difference in their wavelengths.

Accordingly, in this variation, the distances to the objective length are varied by changing the position of the optical element 34. That is, the distance from the optical element 34 to each of the semiconductor lasers 30-1 and 30-2 is varied in accordance with the wavelengths of the laser beams 38-1 and 38-2 projected from the semiconductor lasers 30-1 and 30-2.

According to the structure of the variation, there is no need to apply a so-called achromatic design to the optical system to be shared by the semiconductor lasers 30-1 and 30-2 since the distance from the optical element 34 to each of the semiconductor lasers 30-1 and 30-2 can be varied so as to achieve a color erase. Thus, a freedom of design of the optical system can be increased, and a manufacturing cost of the optical system can be reduced.

Figure 8A:
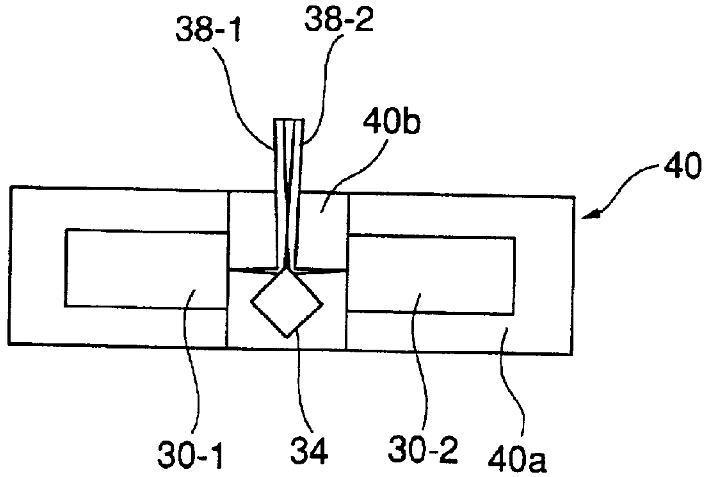
FIG. 8A is a perspective view of an integrated type optical pickup module according to a third embodiment of the present invention.
Figure 8B:
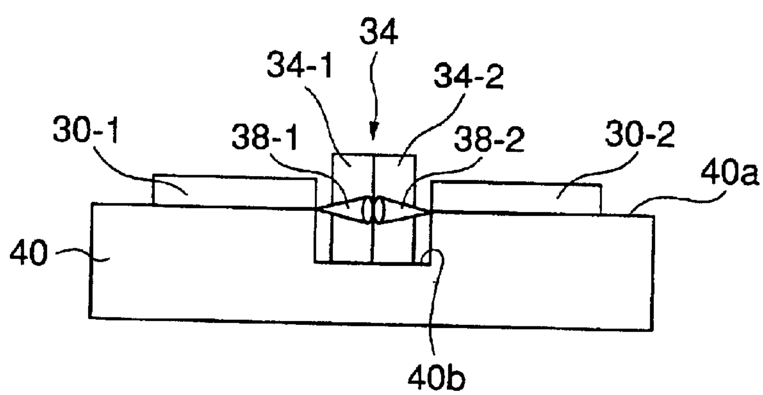
FIG. 8B is a plan view of the integrated type optical pickup module shown in FIG. 8A.

A description will now be given, with reference to FIGS. 8A and 8B, of a third embodiment according to the present invention. FIG. 8A is a perspective view of an integrated type optical pickup module according to the third embodiment of the present invention. FIG. 8B is a plan view of the integrated type optical pickup module shown in FIG. 8A. In FIGS. 8A and 8B, parts that are the same as the parts shown in FIGS. 6A and 6B are given the same reference numerals, and description thereof will be omitted.

In the third embodiment, both the semiconductor lasers 30-1 and 30-2 are mounted on a top surface 38*a* of a submount 40. The submount 40 has a recessed portion having a bottom surface 40*b* so that the semiconductor lasers 30-1 and 30-2 are positioned opposite sides of the recessed portion. The bottom surface 40*b* of the recessed portion is parallel to the top surface 40*a*. The optical element is mounted on the bottom surface 40*b* of the recessed portion.

Accordingly, the optical pickup module according to the present embodiment has substantially the same structure as that of the optical pickup module according to the second embodiment shown in FIGS. 6A and 6B. Thus, the present embodiment can provide the same effects as the second embodiment.

Additionally, in this embodiment, the optical element 34 and the semiconductor lasers 30-1 and 30-2 are mounted to the same submount 40. That is, the semiconductor lasers 30-1 and 30-2 are mounted on the top surface 40*a* of the submount 40 and the optical element 34 is mounted on the bottom surface 40*b* of the recessed portion of the submount 40. Accordingly, the semiconductor lasers 30-1 and 30-2 and the optical element 34 can be mounted with high accuracy in their positions.

In the present embodiment, the semiconductor lasers 30-1 and 30-2 are separated by a distance of several hundreds μm. However, the distance between the apparent light emitting points is less than 100 μm. Thus, the accuracy required for the relative positions of the optical element 34 and the semiconductor lasers 30-1 and 30-2 is as high as about 3 to 5 μm. This accuracy is one order smaller than that required for a submount or stem provided in a conventional optical pickup module. Thus, if the number of parts related to positioning of the optical element 34 and the semiconductor lasers 30-1 and 30-2 is increased, this may lower the accuracy in relative positions. Accordingly, the structure of the present embodiment is preferable to the optical pickup module that requires high accuracy in the relative positions of the optical element 34 and the semiconductor lasers 30-1 and 30-2.

Figure 9A:
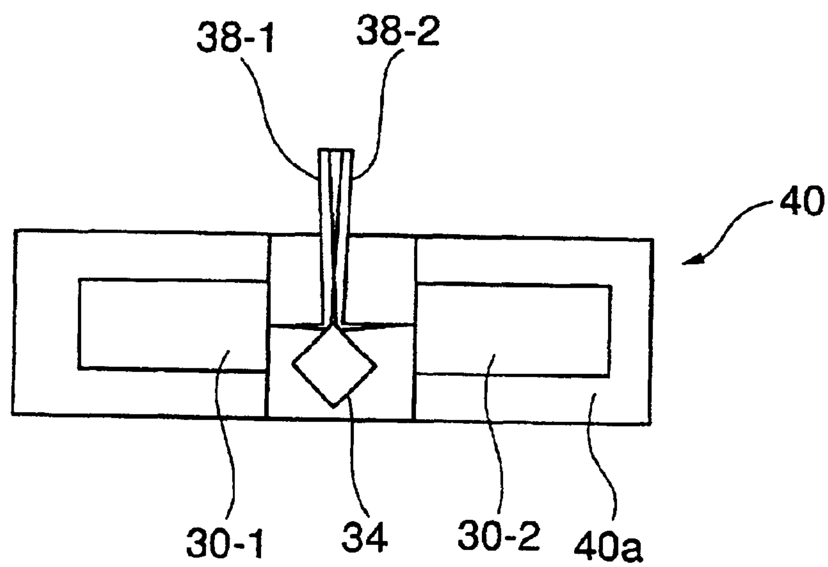
FIG. 9A is a plan view of an optical pickup module according to a variation of the third embodiment of the present invention.
Figure 9B:
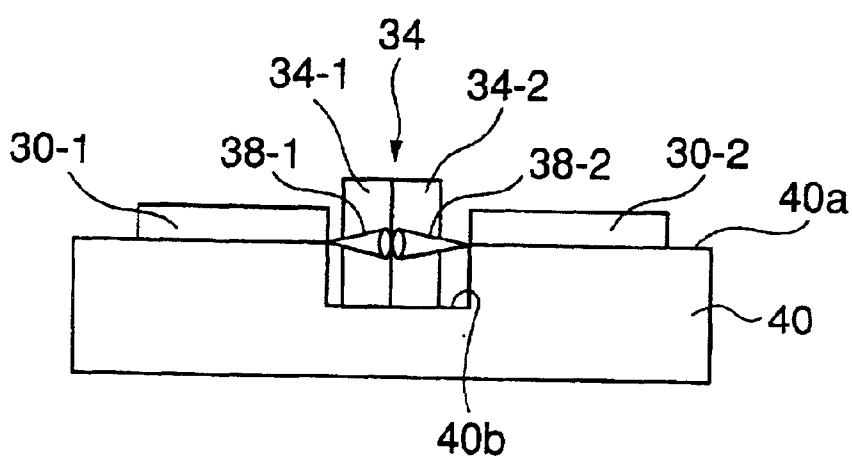
FIG. 9B is a front view of the optical pickup module shown in FIG. 9A.

FIGS. 9A and 9B shows a variation of the third embodiment of the present invention. FIG. 9A is a plan view of an optical pickup module according to the variation of the third embodiment of the present invention. FIG. 9B is a front view of the optical pickup module shown in FIG. 9A.

In the variation shown in FIGS. 9A and 9B, the optical element 34 is located in a different position from the second embodiment shown in FIGS. 6A and 6B. That is, the optical element 34 in this variation is moved by a predetermined distance toward the semiconductor laser 30-1. Accordingly, the optical element is moved away from the semiconductor laser 30-2. That is, the distance between the semiconductor laser 30-1 and the optical element 34 is smaller than the distance between the semiconductor laser 30-2 and the optical element 34.

In this variation, the laser beam 38-1 projected from the semiconductor laser 30-1 has a wavelength smaller than that of the laser beam 38-2 projected from the semiconductor laser 30-2. If the laser beams 38-1 and 38-2 shares the same optical system, the distances from an objective lens to each of the semiconductor devices must be varied due to the difference in their wavelengths.

Accordingly, in this variation, the distances to the objective length are varied by changing the position of the optical element 34. That is, the distance from the optical element 34 to each of the semiconductor lasers 30-1 and 30-2 is varied in accordance with the wavelengths of the laser beams 38-1 and 38-2 projected from the semiconductor lasers 30-1 and 30-2.

According to the structure of the variation, there is no need to apply a so-called achromatic design to the optical system to be shared by the semiconductor lasers 30-1 and 30-2 since the distance from the optical element 34 to each of the semiconductor lasers 30-1 and 30-2 can be varied so as to achieve a color erase. Thus, a freedom of design of the optical system can be increased, and a manufacturing cost of the optical system can be reduced.

Figure 10A:
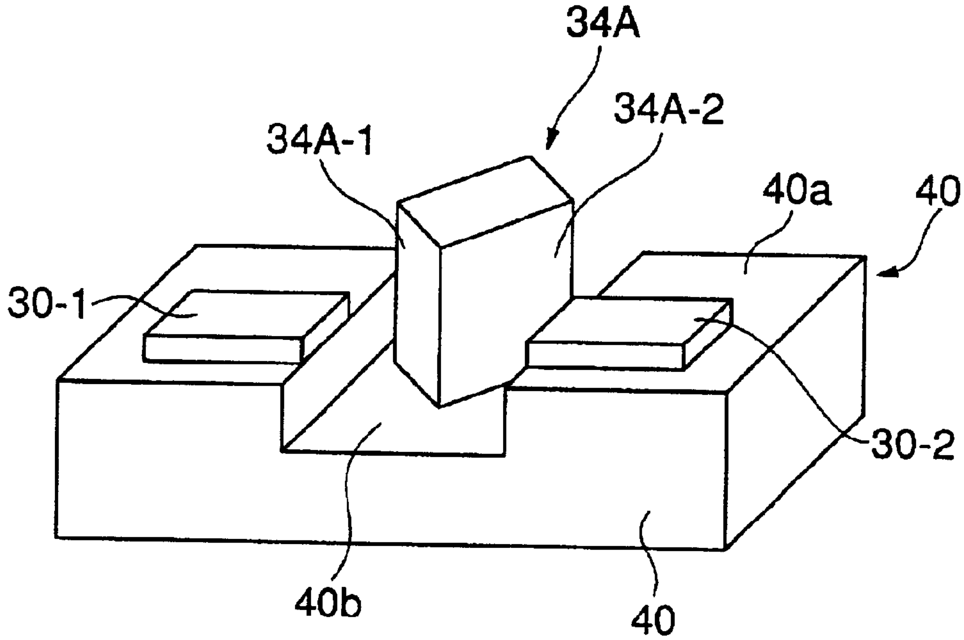
FIG. 10A is a perspective view of an integrated type optical pickup module according to a fourth embodiment of the present invention.
Figure 10B:
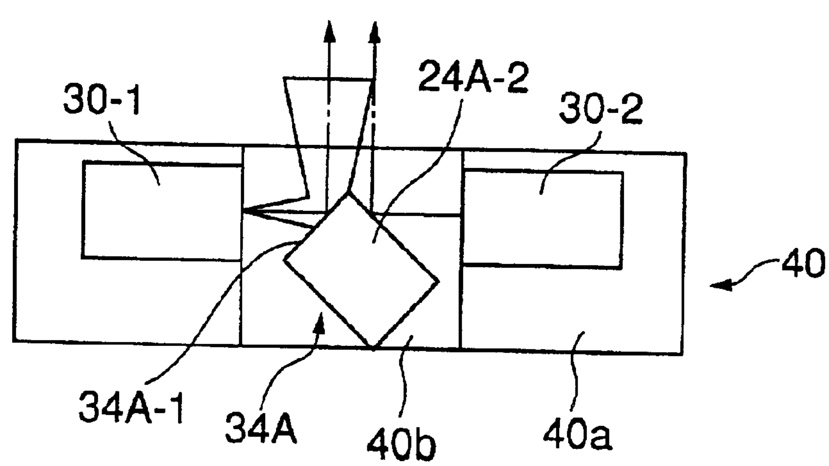
FIG. 10B is a plan view of the integrated type optical pickup module shown in FIG. 10A.
Figure 11A:
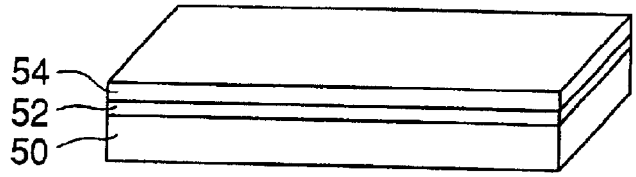
FIGS. 11A–11D are illustrations for explaining a manufacturing method of an optical element formed of a single crystal silicon substrate.
Figure 11B:
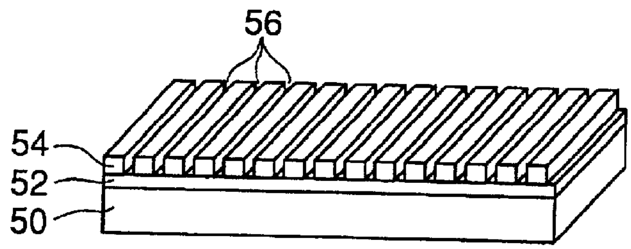
Figure 11C:
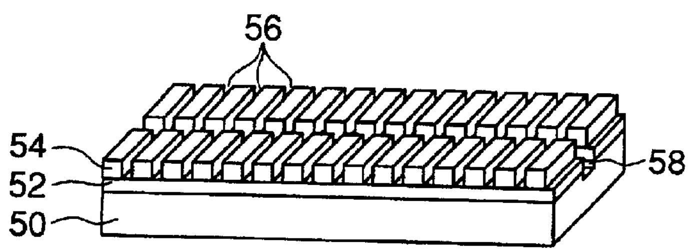
Figure 11D:
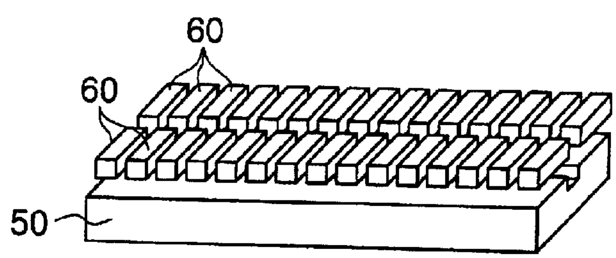

A description will now be given, with reference to FIGS. 10A and 10B, of a fourth embodiment of the present invention. FIG. 10A is a perspective view of an integrated type optical pickup module according to a fourth embodiment of the present invention; FIG. 10B is a plan view of the integrated type optical pickup module shown in FIG. 10A. In FIGS. 10A and 10B, parts that are the same as the parts shown in FIGS. 8A and 8B are give the same reference numerals, and descriptions thereof will be omitted.

The optical pickup module according to the fourth embodiment has the same structure as the optical pickup module according to the third embodiment shown in FIGS. 8A and 8B except for an optical element 34A having a shape different from the shape of the optical element 34. That is, the optical element 34A of the present embodiment has a rectangular column shape or rectangular parallelepiped shape, while the optical element 34 of the third embodiment has a square column shape.

The optical element 34A is mounted on the bottom surface 40*a* of the recessed portion formed in the submount 40 so that the optical element 34A is interposed between the semiconductor lasers 30-1 and 30-2. The optical element 34A has the same structure as the optical element 24 of the first embodiment shown in FIGS. 3A and 3B, and can be produced by the same manufacturing process as the optical element 24. That is, the reflecting surfaces 34A-1 and 34A-2 are the same as the reflecting surfaces 24-1 and 24-2 of the optical element 24. Additionally, the optical element 34A has a mounting surface that is perpendicular to both the reflecting surfaces 34A-1 and 34A-2. The optical element is mounted to the submount 40 by connecting the mounting surface to the bottom surface 40*a* of the recessed portion of the submount 40.

A major difference between the present embodiment and the first embodiment is in that the laser beams reflected or deflected by the optical element 34A travels in a direction parallel to the top surface 40*a* on which the semiconductor lasers 30-1 and 30-2 are mounted while the laser beams reflected or deflected by the optical element 24 of the first embodiment travels in a direction perpendicular to the top surface 22*b* on which the semiconductor lasers 20-1 and 20-2 are mounted.

According to the above-mentioned arrangement of the optical element 34A and the semiconductor lasers 30-1 and 30-2, the semiconductor lasers 30-1 and 30-2 and a light-receiving element such as a phtodiode for detecting a signal can be mounted on the same surface.

As appreciated from the above description, the optical pickup module according to the fourth embodiment can provide the same effects as that of the optical pickup module according to the first embodiment of the present embodiment. That is, since the reflecting surface 34A-1 has a shorter side and the reflecting surface 34A-2 has a longer side of the rectangular shape, the reflecting surface 34A-1 can be easily distinguishable from the reflecting surface 34A-2 by visual comparison.

A description will now be given, with reference to FIG. 11, of a manufacturing method of the above-mentioned optical elements 24, 34 and 34A. FIG. 11 is an illustration for explaining a manufacturing method of an optical element formed of a single crystal silicon substrate.

As described in the first embodiment, the optical element having the rectangular parallelepiped shape or square column shape can be formed by an anisotropic etching of a single crystal silicon substrate. First, as shown in FIG. 11-(*a*), an SOI substrate is prepared by forming an oxidation layer 52 on a silicon (Si) substrate 50 as a base and forming an SOI layer 54 on the oxidation layer 52. The SOI layer 54 has the (110) plane of the single crystal silicon. Then, as shown in FIG. 11-(*b*), grooves 56, which are parallel to the (111) plane of the single crystal silicon, are formed by anisotropic etching. Thereafter, as shown in FIG. 11-(*c*), a groove 58 is formed by dicing along a line perpendicular to the longitudinal direction of the grooves 56. Then, as shown in FIG. 11-(*d*), the oxidation film 52 is removed by etching so as to separate optical elements 60 having the (110) plane and the (111) plane. Thereafter, an aluminum thin film is deposited on the reflecting surfaces of each of the optical elements 60.

As mentioned above, anisotropic etching of single crystal silicon is applicable to a manufacturing process of the optical element 60. That is, anisotropic etching of the single crystal silicon having the (111) plane facilitates the production of the optical element 60 having reflecting surfaces perpendicular to each other. The (111) plane of the single crystal silicon has an etching rate extremely lower than that of other planes when a particular etchant is used. For example, if a single crystal silicon substrate having the (110) plane on the surface thereof is etched by the particular etchant, a groove having a side surface corresponding to the (111) plane can be formed on the (110) plane surface. The (111) plane surface of the groove is perpendicular to the (110) plane surface. Since the (111) plane surface has a flatness of an atomic order, the (111) plane surface is suitable for the reflecting surface. Accordingly, the optical element 60 can be easily manufactured by using the above-mentioned anisotropic etching of the single crystal silicon substrate.

A description will now be given of integrated type optical pickups using the above-mentioned optical pickup modules.

Figure 12:
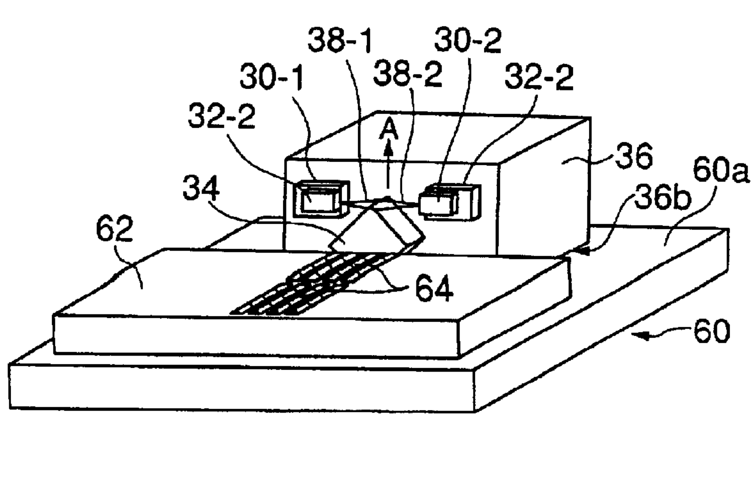
FIG. 12 is a perspective view of an integrated type optical pickup provided with the optical pickup module according to the second embodiment of the present invention.

FIG. 12 is a perspective view of an integrated type optical pickup provided with the optical pickup module according to the second embodiment of the present invention. The semiconductor lasers 30-1 and 30-2 are mounted on the module base 36 via the respective submounts 32-1 and 32-2 with the optical element 34 interposed therebetween. The laser beams 38-1 and 38-2 projected from the respective semiconductor lasers 30-1 and 30-2 are reflected or deflected by the respective reflecting surfaces 34-1 and 34-2 in a direction indicted by an arrow A.

The module base 36 is mounted on a flat surface 60*a* of a base substrate 60 via a mounting surface 36*b* being connected to the flat surface 60*a*. The mounting surface 36*b* is perpendicular to the top surface 36*a* on which the semiconductor lasers 30-1 and 30-2 are mounted. Additionally, a semiconductor substrate 62 is mounted on the flat surface 60*a* of the base substrate. The semiconductor substrate 62 has a plurality of light-receiving elements 64 such as photodiodes on a top surface thereof.

The laser beam 38-1 or 38-2 projected in the direction indicated by the arrow A is irradiated onto an optical disc by passing through an optical system (not shown in the figure), and is reflected by the recording surface of the optical disc to be read or written. The reflected laser beam 38-1 or 38-2 returns through the optical system to the light-receiving elements 64 so that the laser beam signals are converted into electric signals. The optical system includes an objective lens which focuses the laser beam onto the optical disc and a hologram element which guides the laser beam to the light-receiving elements 64.

Since the optical pickup modules according to one of the above mentioned embodiments can provide a very small distance between the apparent light-emitting points, the integrated optical pickup, which comprises the optical pickup module, the light-receiving elements and the optical system including the objective lens and the hologram element, can be easily designed with a reduced manufacturing cost.

Conventionally, a semiconductor laser and a semiconductor substrate having light-receiving elements are mounted on different surfaces of a heat sink formed in a stem. Thus, the heat sink must be produced with high accuracy, thereby increasing a manufacturing cost of the heat sink. However, the optical pickup module according to one of the above-mentioned embodiments eliminates the necessity of high accuracy in fabrication of the stem including the heat sink since the optical pickup module according to one of the above-mentioned embodiments can provide high accuracy in angles and positions of the semiconductor lasers by itself by merely mounting both the optical pickup module and the semiconductor substrate on the flat surface of the base substrate. Thus, the accuracy in the fabrication of the stem can be greatly reduced, thereby reducing a manufacturing cost of the stem.

Figure 13:
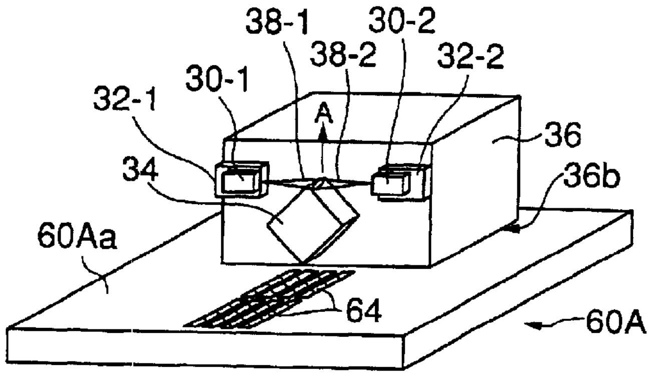
FIG. 13 is a perspective view of a variation of the integrated type optical pickup shown in FIG. 12.

FIG. 13 is a perspective view of a variation of the integrated type optical pickup shown in FIG. 12. In FIG. 13, parts that are the same as the parts shown in FIG. 12 are given the same reference numerals, and descriptions thereof will be omitted.

The integrated type optical pickup shown in FIG. 13 has the same structure as the integrated type optical pickup shown in FIG. 12 except for the semiconductor substrate 62 being eliminated. That is, the light-receiving elements 64 are formed on a top surface 60A*a* of a base substrate 60A instead of the top surface 60*a* of the semiconductor substrate 60 eliminated.

In order to achieve an integrated type optical pickup that can be used for the next generation S-DVD, the mounting accuracy must be higher than the conventional structure. One of the factors which may affect the mounting accuracy is a tolerance in the thickness of the semiconductor substrate on which the light-receiving elements 64 are formed. The tolerance of a thickness of an 8-inch substrate is normally 10 μm, which is too large for the mounting accuracy of the optical pickup. It is not a practical way to use a substrate having a more accurate thickness since the manufacturing cost of the optical pickup is excessively increased.

Considering the above-mentioned situation, the integrated type optical pickup is preferably used for the next generation optical disc since the semiconductor substrate is eliminated in the optical pickup module, which eliminates an influence of the thickness of the semiconductor substrate to the mounting accuracy of the optical pickup module and the light-receiving elements.

Figure 14:
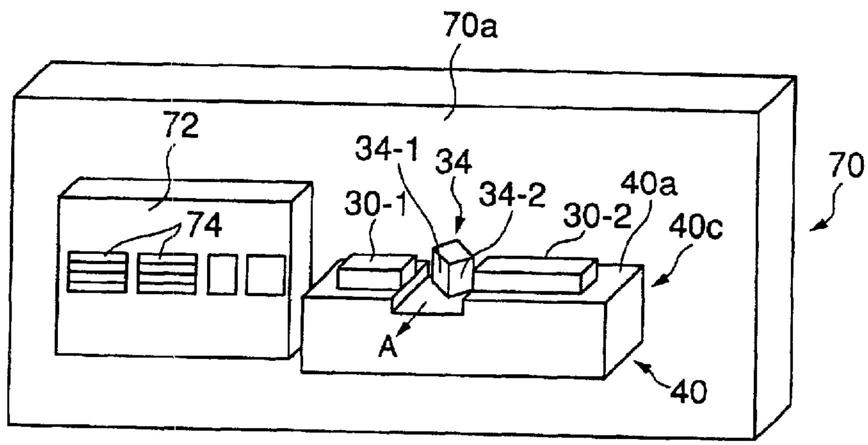
FIG. 14 is a perspective view of an integrated type optical pickup provided with the optical pickup module according to the third embodiment of the present invention.

FIG. 14 is a perspective view of an integrated type optical pickup provided with the optical pickup module according to the third embodiment of the present invention. The semiconductor lasers 30-1 and 30-2 are mounted on the module base 40 with the optical element 34 interposed therebetween. The laser beams 38-1 and 38-2 projected from the respective semiconductor lasers 30-1 and 30-2 are reflected or deflected by the respective reflecting surfaces 34-1 and 34-2 in a direction indicted by an arrow A.

The module base 40 is mounted on a flat surface 70*a* of a base substrate 70 via a mounting surface 40*c* being connected to the flat surface 70*a*. The mounting surface 40*c* is perpendicular to the top surface 40*a* on which the semiconductor lasers 30-1 and 30-2 are mounted. Additionally, a semiconductor substrate 72 is mounted on the flat surface 70*a* of the base substrate 70. The semiconductor substrate 72 has a plurality of light-receiving elements 74 such as photodiodes on a top surface thereof.

The laser beam projected from the semiconductor lasers 30-1 or 30-2 in the direction indicated by the arrow A is irradiated onto an optical disc by being passed through an optical system (not shown in the figure), and is reflected by the recording surface of the optical disc to be read or written. The reflected laser beam returns through the optical system to the light-receiving elements 74 so that the laser beam signals are converted into electric signals. The optical system includes an objective lens which focuses the laser beam onto the optical disc and a hologram element which guides the laser beam to the light-receiving elements 64.

Since the optical pickup modules according to one of the above mentioned embodiments can provide a very small distance between the apparent light-emitting points, the integrated optical pickup, which comprises the optical pickup module, the light-receiving elements and the optical system including the objective lens and the hologram element, can be easily designed with a reduced manufacturing cost.

Accordingly, the integrated type optical pickup shown in FIG. 14 can provide the same effects as that of the integrated type optical pickup shown in FIG.> 12.

Figure 15:
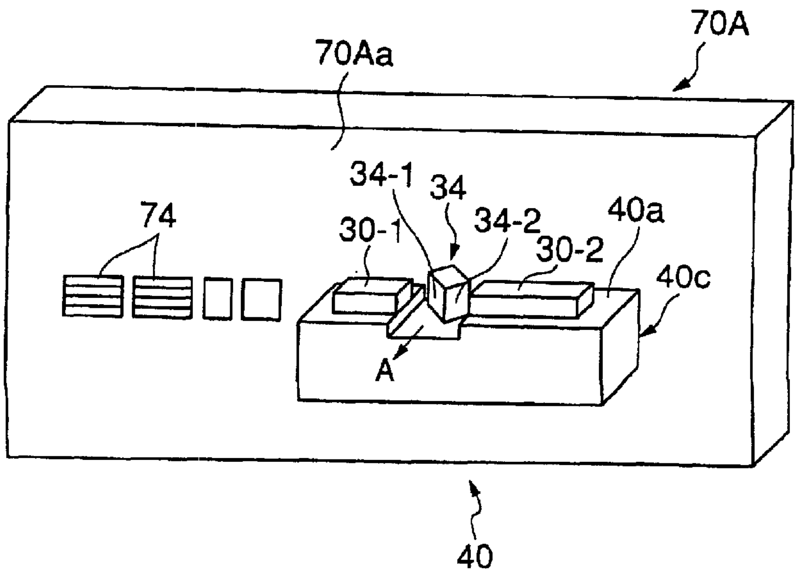
FIG. 15 is a perspective view of a variation of the integrated type optical pickup shown in FIG. 12.

FIG. 15 is a perspective view of a variation of the integrated type optical pickup shown in FIG. 14. In FIG. 15, parts that are the same as the parts shown in FIG. 14 are given the same reference numerals, and descriptions thereof will be omitted.

The integrated type optical pickup shown in FIG. 15 has the same structure as the integrated type optical pickup shown in FIG. 14 except for the semiconductor substrate 72 being eliminated. That is, the light-receiving elements 74 are formed on a top surface 70A*a* of a base substrate 70A instead of the top surface 70*a* of the semiconductor substrate 60 eliminated.

Accordingly, similar to the integrated type optical pickup shown in FIG. 13, the integrated type optical pickup shown in FIG. 15 is preferably used for the next generation optical disc since the semiconductor substrate is eliminated in the optical pickup module, which eliminates an influence of the thickness of the semiconductor substrate to the mounting accuracy of the optical pickup module and the light-receiving elements.

In the above-mentioned embodiments and variations, the present invention is directed to the optical pickup. However, the present invention is applicable to an application in which a small distance is required between light-emitting pints such as a light source of a copy machine or a printer.

The present invention is not limited to the specifically disclosed embodiments, and variations and modification will be made without departing from the scope of the present invention.

The present invention is based on Japanese priority applications No. 2000-058921 filed on Mar. 3, 2000, No. 2000-275557 filed on Sep. 11, 2000 and No. 2000-401682 filed on Dec. 28, 2000, the entire contents of which are hereby incorporated by reference.

What is claimed is:

1. An integrated type optical pickup module comprising:

a first semiconductor laser and a second semiconductor laser;

an optical element interposed between said first and second semiconductor lasers, said optical element having a first reflecting surface and a second reflecting surface perpendicular to said first reflecting surface, said first reflecting surface reflecting a laser beam projected from said first semiconductor laser, said second reflecting surface reflecting a laser beam projected from said second semiconductor laser, said optical element further having a mounting surface perpendicular to both said first and second reflecting surfaces; and a submount having a top surface on which said first and second semiconductor lasers are mounted, wherein said optical element is mounted to said submount via said mounting surface of said optical element.

2. The integrated type optical pickup module as claimed in claim 1, wherein said submount has a recessed portion in which said optical element is positioned.

3. The integrated type optical pickup module as claimed in claim 2, wherein said recessed portion has a side surface perpendicular to said top surface of said submount, and said mounting surface of said optical element is connected to said side surface of said recessed portion.

4. The integrated type optical pickup module as claimed in claim 2, wherein said recessed portion has a bottom surface parallel to said top surface of said submount, and said mounting surface of said optical element is connected to said bottom surface of said recessed portion.

5. The integrated type optical pickup module as claimed in claim 1, wherein said submount is made of an insulating material.

6. The integrated type optical pickup module as claimed in claim 5, wherein said submount is formed of a multi-layered substrate made of ceramics.

7. The integrated type optical pickup module as claimed in claim 1, wherein said optical element has a rectangular parallelepiped shape.

8. The integrated type optical pickup module as claimed in claim 7, wherein said optical element is formed of single crystal silicon, and said first and second reflecting surfaces of said optical element correspond to the (110) plane and the (111) plane of the single crystal silicon.

9. The integrated type optical pickup module as claimed in claim 8, wherein said second reflecting surface corresponds to the (111) plane, and said second semiconductor laser projects a laser beam having a wavelength smaller than a wavelength of a laser beam projected from said first semiconductor laser.

10. The integrated type optical pickup module as claimed in claim 7, wherein said first reflecting surface has a size different from a size of said second reflecting surface.

11. An integrated type optical pickup module comprising:

a first semiconductor laser and a second semiconductor laser; and an optical element interposed between said first and second semiconductor lasers, said optical element having a first reflecting surface and a second reflecting surface perpendicular to said first reflecting surface, said first reflecting surface reflecting a laser beam projected from said first semiconductor laser, said second reflecting surface reflecting a laser beam projected from said second semiconductor laser, wherein a heterojunction surface of said first semiconductor laser is substantially perpendicular to said first reflecting surface, and a heterojunction surface of said second semiconductor laser is substantially perpendicular to said second reflecting surface.

12. The integrated type optical pickup module as claimed in claim 11, wherein an optical axis of said first semiconductor laser forms an angle of 45 degrees with respect to said first reflecting surface, and an optical axis of said second semiconductor laser forms an angle of 45 degrees with respect to said second reflecting surface.

13. The integrated type optical pickup module as claimed in claim 12, further comprising a submount having a top surface on which said first and second semiconductor lasers are mounted.

14. The integrated type optical pickup module as claimed in claim 12, further comprising a submount on which said first and second semiconductor lasers and said optical element are mounted.

15. The integrated type optical pickup module as claimed in claim 14, wherein said submount has a top surface on which said first and second semiconductor lasers are mounted, and said submount further having a recessed portion between said first and second semiconductor lasers so that said optical element is situated in said recessed portion.

16. The integrate type optical pickup module as claimed in claim 11, wherein said optical element has a rectangular parallelepiped shape.

17. The integrated type optical pickup module as claimed in claim 16, wherein said optical element is made of a semiconductor material.

18. The integrated type optical pickup module as claimed in claim 17, wherein said optical element is formed of single crystal silicon, and said first and second reflecting surfaces of said optical element correspond to the (110) plane and the (111) plane of the single crystal silicon.

19. The integrated type optical pickup module as claimed in claim 18, wherein said second reflecting surface corresponds to the (111) plane, and said second semiconductor laser projects a laser beam having a wavelength smaller than a wavelength of a laser beam projected from said first semiconductor laser.

20. The integrated type optical pickup module as claimed in claim 16, wherein said first reflecting surface has a size different from a size of said second reflecting surface.

21. An optical pickup comprising:

a laser beam source; and an optical system which guides a laser beam projected from said laser beam source toward an optical recording medium and receives the laser beam reflected by the optical recording medium so as to guides the reflected laser beam to light-receiving elements, wherein said laser beam source includes an integrated type optical pickup module comprising:

a first semiconductor laser and a second semiconductor laser;

an optical element interposed between said first and second semiconductor lasers, said optical element having a first reflecting surface and a second reflecting surface perpendicular to said first reflecting surface, said first reflecting surface reflecting a laser beam projected from said first semiconductor laser, said second reflecting surface reflecting a laser beam projected from said second semiconductor laser, said optical element further having a mounting surface perpendicular to both said first and second reflecting surfaces; and a submount having a top surface on which said first and second semiconductor lasers are mounted, wherein said optical element is mounted to said submount via said mounting surface of said optical element.

22. The optical pickup as claimed in claim 21, wherein said submount of said integrated type optical pickup module has a mounting surface perpendicular to said top surface so that said integrated type optical pickup module is mounted to a flat surface of a base substrate via said mounting surface; and a semiconductor substrate having said light-receiving elements is also mounted on said flat surface of said base substrate.

23. The optical pickup as claimed in claim 21, wherein said submount of said integrated type optical pickup module has a mounting surface perpendicular to said top surface so that said integrated type optical pickup module is mounted to a flat surface of a base substrate via said mounting surface; and said light-receiving elements are formed on said flat surface of said base substrate.

24. An optical pickup comprising:

a laser beam source; and an optical system which guides a laser beam projected from said laser beam source toward an optical recording medium and receives the laser beam reflected by the optical recording medium so as to guides the reflected laser beam to light-receiving elements, wherein said laser beam source includes an integrated type optical pickup module comprising:

a first semiconductor laser and a second semiconductor laser; and an optical element interposed between said first and second semiconductor lasers, said optical element having a first reflecting surface and a second reflecting surface perpendicular to said first reflecting surface, said first reflecting surface reflecting a laser beam projected from said first semiconductor laser, said second reflecting surface reflecting a laser beam projected from said second semiconductor laser, wherein a heterojunction surface of said first semiconductor laser is substantially perpendicular to said first reflecting surface, and a heterojunction surface of said second semiconductor laser is substantially perpendicular to said second reflecting surface.

25. The optical pickup as claimed in claim 24, wherein said integrated type optical pickup module further comprises a submount having a top surface on which said first and second laser beams are mounted; said submount has a mounting surface perpendicular to said top surface so that said integrated type optical pickup module is mounted to a flat surface of a base substrate via said mounting surface; and a semiconductor substrate having said light-receiving elements is also mounted on said flat surface of said base substrate.

26. The optical pickup as claimed in claim 24, wherein said integrated type optical pickup module further comprises a submount having a top surface on which said first and second laser beams are mounted; said submount has a mounting surface perpendicular to said top surface so that said integrated type optical pickup module is mounted to a flat surface of a base substrate via said mounting surface; and said light-receiving elements are formed on said flat surface of said base substrate.

* * * * *